(12) United States Patent
Jiang et al.

(10) Patent No.: US 11,275,830 B2
(45) Date of Patent: Mar. 15, 2022

(54) SYSTEM AND METHOD FOR VIDEO BACKDOOR ATTACK

(71) Applicant: Fudan University, Shanghai (CN)

(72) Inventors: Yugang Jiang, Shanghai (CN); Shihao Zhao, Shanghai (CN); Xingjun Ma, Shanghai (CN); Jingjing Chen, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 17/158,012

(22) Filed: Jan. 26, 2021

(65) Prior Publication Data

US 2022/0027462 A1  Jan. 27, 2022

(30) Foreign Application Priority Data

Jan. 23, 2020 (CN) .......................... 202010077148.0

(51) Int. Cl.
*G06F 21/00* (2013.01)
*G06F 21/55* (2013.01)
*G06N 7/00* (2006.01)

(52) U.S. Cl.
CPC ............. *G06F 21/55* (2013.01); *G06N 7/005* (2013.01); *G06F 2221/034* (2013.01)

(58) Field of Classification Search
CPC .... G06F 21/10; G06F 21/55; G06F 2221/034; G06N 7/005; G06N 7/023; H04L 63/1416; H04L 63/145
See application file for complete search history.

(56) References Cited

U.S. PATENT DOCUMENTS

| | | | | |
|---|---|---|---|---|
| 7,490,149 B2 * | 2/2009 | Omote | ................... | H04L 29/06 709/222 |
| 7,624,444 B2 * | 11/2009 | Gupta | ..................... | G06F 21/55 705/51 |
| 7,934,103 B2 * | 4/2011 | Kidron | .................. | H04L 63/145 713/188 |
| 9,092,616 B2 * | 7/2015 | Kumar | ................ | H04L 63/1425 |

(Continued)

OTHER PUBLICATIONS

Shihao Zhao, Xingjun Ma, Xiang Zheng, James Bailey, Jingjing Chen, Yu-Gang Jiang, Clean-Label Backdoor Attacks on Video Recognition Models, pp. 1-10, Shanghai Key Lab of Intelligent Information Processing, School of Computer Science, Fudan University, School of Computing and Information Systems, The University of Melbourne (Mar. 6, 2020).

(Continued)

*Primary Examiner* — Hosuk Song
(74) *Attorney, Agent, or Firm* — Brad Bertoglio; Intelink Law Group, P.C.

(57) ABSTRACT

Systems and methods for video backdoor attack include a trigger generation module for generating a universal adversarial trigger pattern specific to a task, an adversarial perturbation module for producing videos with manipulated features; and a poisoning and inference module for injecting the generated trigger into perturbed videos as poisoned samples for training; wherein the trigger pattern is patched and optimized on videos from all non-target classes but relabeled to a target class, and the trigger pattern is a universal adversarial trigger pattern generated by minimizing the cross-entropy loss.

18 Claims, 5 Drawing Sheets

(56) References Cited

U.S. PATENT DOCUMENTS

2017/0091450 A1* 3/2017 Turgeman .............. G06F 21/32
2020/0050945 A1 2/2020 Chen et al.

OTHER PUBLICATIONS

Gu et al., BadNets: Identifying Vulnerabilities in the Machine Learning Model Supply Chain, "Badnets: Identifying vulnerabilities in the machine learning model supply chain", arXiv preprint arXiv: 1708.06733, 2017, pp. 1-13.

Alex Krizhevsky, Learning Multiple Layers of Features from Tiny Images, Apr. 9, 2009, pp. 1-60.

Khurram Soomro, Amir Roshan Zamir and Mubarak Shah, UCF101: A Dataset of 101 Human Actions Classes From Videos in the Wild, CRCV-TR-12-01, Nov. 2012, pp. 1-7.

Mark Everingham, S. M. Ali Eslami, Luc Van Gool, Christopher K. I. Williams, John Winn, Andrew Zisserman, The PASCAL Visual Object Classes Challenge: A Retrospective, Received: Sep. 12, 2013 / Accepted: May 23, 2014 / Published online: Jun. 25, 2014, pp. 98-136.

Kaiming He, Xiangyu Zhang, Shaoqing Ren, Jian Sun, Deep Residual Learning for Image Recognition, Microsoft Research, CVPR, 2016, pp. 1-12.

Joäo Carreiray, Andrew Zissermany, Quo Vadis, Action Recognition? A New Model and the Kinetics Dataset, Department of Engineering Science, University of Oxford, CoRR, 2017, pp. 1-10.

Ian J. Goodfellow, Jonathon Shlens & Christian Szegedy, Google Inc., Mountain View, CA, Explaining and Harnessing Adversarial Examples, Mar. 20, 2015, pp. 1-11.

Javier Sanchez, Enric Meinhardt-Llopis, Gabriele Facciolo, TV-L1 Optical Flow Estimation, IPOL, 2013, pp. 137-150.

* cited by examiner

SYSTEM AND METHOD FOR VIDEO BACKDOOR ATTACK

The present patent application claims priority to China patent application no. 202010077148.0, filed on Jan. 23, 2020, the entire content of which is incorporated herein by reference.

TECHNICAL FIELD

This invention is related to a system for video backdoor attack, and more particularly, for clean-label backdoor attacks on video recognition models. This invention is also related to a method thereof.

BACKGROUND

Deep neural networks (DNNs) are a family of powerful models that have been widely used to achieve state-of-the-art performance in many applications such as image classification, natural language processing and video recognition. Despite great success, DNNs have been criticized due to their low transparency, poor interpretability, and more importantly vulnerabilities to adversarial attacks and backdoor attacks. This has raised concerns for the development of DNNs in applications such as face recognition, autonomous driving, video analysis, and medical diagnosis.

Compared with adversarial attacks which are test time attacks but on clean models, backdoor attacks pose more severe threats by installing a hidden trigger into a target model at training time. In particular, a backdoor attack poisons training data with a backdoor trigger (or pattern) so as to set up a link between the backdoor pattern and a target label. Models trained on poisoned data will remember the trigger pattern, and at test time, consistently predict a particular target class whenever the trigger pattern is present. Backdoor attacks are hard to detect since backdoored models still perform accurately on clean validation or test data. Backdoor attacks can happen in scenarios when users download DNN models from an untrusted party or train models on data collected from unreliable sources, which is quite common in deep learning. The study of backdoor attacks has thus become crucial for secure deep learning.

Existing backdoor attacks can be categorized into two types: (1) poison-label attacks which not only poison training examples but also change training labels (to the target class); and (2) clean-label attacks which poison only training examples while leaving training labels unchanged.

Compared with poison-label attacks, clean-label attacks are more stealthy and resistant to data filtering or detection techniques. While existing clean-label backdoor attacks have mostly been studied in the image domain with image classification models, their effectiveness in more demanding conditions such as on videos is still unexplored.

Gu et al. first investigated backdoor attacks in the deep learning pipeline, and proposed the Badnets attack ("Badnets: Identifying vulnerabilities in the machine learning model supply chain", arXiv preprint arXiv:1708.06733, 2017). BadNets injects a trigger pattern (sticker or checkerboard) to a set of randomly selected training images. Given a target class of the attacker's interest, the poisoned images are usually selected from the other classes than the target class, and their labels will be changed to the target class. This is to explicitly associate the poisoned images to the target class. Different trigger patterns have been proposed for poison-label attacks. For example, an additional image attached onto or blended into the target image (Chen et al., "Targeted backdoor attacks on deep learning systems using data poisoning", arXiv preprint arXiv:1712.05526, 2017), a fixed watermark on the target image (Steinhardt et al., "Certified defenses for data poisoning attacks", NIPS, 2017). Since the poisoned images are mislabeled, poison-label attacks can be easily detected by simple data filtering or human inspection.

To make the attack less obvious, Turner et al. ("Clean-label backdoor attacks", https://people.csail.mitedu/madry/lab/, 2019) proposed the clean-label backdoor attack which does not need to change the labels of poisoned images. Since the clean-label poisoned images still have labels that are consistent with their main contents, clean-label backdoor attacks are more difficult to detect. However, this significantly increases the difficulty of the attack as the trigger pattern is no longer strongly associated with the target class, thus may get filtered out easily as irrelevant information by convolutional operations. Turner et al. further introduced two techniques to make the attack more effective: 1) latent space interpolation using GANs and 2) adversarial perturbations bounded by $l_p$-norm. Both techniques can force the model to learn the trigger pattern instead of the original contents of the image. Although high success rate can be achieved under easy conditions, i.e., on low-resolution image datasets, this attack has failed under strict conditions imposed by video datasets.

Therefore, there is a need to provide a novel video backdoor attack. There is also a need to provide a more powerful backdoor trigger to address the limitation of Turner et al., in attacking video recognition models.

SUMMARY

It is surprising to find that existing backdoor attacks are far less effective on videos, and there are 4 strict conditions where existing image backdoor attacks are likely to fail:
1) scenarios with more input dimensions (eg. videos vs images),
2) scenarios with high resolution (eg. 224×224 vs 32×32),
3) scenarios with a large number of classes having very few examples per class (a "sparse dataset"), and
4) attacks with access to the correct labels (eg. clean-label attacks).

Five different datasets are used to simulate the first 3 strict conditions under the clean-label setting (eg. the fourth condition), and the attack success rate of one state-of-the-art clean-label backdoor attack Turner et al. under different strict conditions is tested.

TABLE 1

|  | CIFAR-10 | CIFAR-100 | VOC2012-10 | UCF-10 | UCF-101 | UCF-101 (ours) |
|---|---|---|---|---|---|---|
| Success rate (%) | 78.2 | 43.7 | 25.2 | 47.2 | 1.1 | 82.2 |
| Sparse dataset | × | ✓ | × | × | ✓ | ✓ |
| High resolution | × | × | ✓ | × | ✓ | ✓ |
| Video | × | × | × | ✓ | ✓ | ✓ |

The attack success rate (%) of existing clean-label backdoor attack Turner et al. under different strict conditions. The attack was applied to poison 30% of training examples in the target class using trigger size of 1% image area. "High resolution" refers to images/frames of size 224×224 (compared with size 32×32), while "sparse dataset" refers to CIFAR-100 (Krizhevsky et al, "Learning multiple layers of features from tiny images", Technical report, Citeseer, 2009) and UCF-101 (Soomro et al., "UCF101: A dataset of 101 human actions classes from videos in the wild", *CoRR*, 2012) (compared with other 10-class datasets). Datasets VOC2012-10 and UCF-10 consist of 10 random classes from VOC2012 (Everingham et al., "The PASCAL Visual Object Classes Challenge 2012 (VOC2012) Results", http://www.pascalnetwork.org/challenges/VOC/voc2012/workshop/index.html) and UCF-101 respectively. We use target model ResNet50 (He et al., "Deep residual learning for image recognition", CVPR, 2016) for all image datasets and I3D (Carreira et al., "Quo vadis, action recognition? A new model and the kinetics dataset", *CoRR*, 2017) for video datasets and the first class (alphabetical order) as the target class. The last column shows result of our proposed attack under the strictest condition (eg. UCF-101).

In this invention it is proposed a universal adversarial trigger for backdoor attack against video recognition models to address the limitation of existing backdoor attacks under strict conditions. The universal adversarial trigger is generated by exploiting adversarial technique (Goodfellow et al., "Explaining and harnessing adversarial examples", *CoRR*, 2014; Perez et al., "TV-L1 Optical Flow Estimation", *IPOL*, 2013) to minimize the classification loss from non-target classes to the target class. When used to poison training data, we also apply adversarial perturbation on the target image to force the target model to focus more on the trigger pattern. Different to universal adversarial perturbation crafted to fool DNN models at test time (eg. adversarial attacks), here it is exploited as a trigger pattern for more powerful backdoor attacks.

As shown in Table 1, using the same poisoning rate and trigger size, our proposed attack can achieve a significantly higher success rate of 82.2%. Our video backdoor attack cannot be completely avoided by existing backdoor detection methods; and can generally be applied to improve backdoor attacks on image models.

In one aspect of this invention, it is provided a system for video backdoor attack, including a trigger generation module for generating a universal adversarial trigger pattern specific to a task, an adversarial perturbation module for producing videos with manipulated features; and an poisoning and inference module for injecting the generated trigger pattern into perturbed videos as poisoned samples for training.

Preferably, the trigger pattern is patched and optimized on videos from all non-target classes but relabeled to a target class.

Preferably, the trigger pattern is a universal adversarial trigger pattern.

Preferably, the trigger pattern is generated by optimizing towards the target class.

Preferably, the universal adversarial trigger pattern is generated by minimizing the cross-entropy loss.

Preferably, the universal adversarial trigger pattern is generated by minimizing the cross-entropy loss as follows:

$$\min_t \sum_{i=1}^{M} -\frac{1}{l} \sum_{j=1}^{l} y_j \log(h_j(\tilde{x}_i)), \quad (1)$$

wherein t represents the trigger pattern, x represents the videos in non-target categories, y represents the target label, l represents dimension of the one-hot vector of target label y, M is the total number of training samples from non-target classes, $h=F(\tilde{x})$ is the softmax output of the clean-trained model, $\tilde{x}=(1-m)*x+m*t$ is the poisoned samples.

Preferably, a small region at the bottom right corner of the input video is taken as a trigger area, and the trigger area is randomly initialized while the other areas are masked off.

Preferably, during training, the trigger area is iteratively perturbed on different videos from all non-target classes, which are re-labeled to the target class.

Preferably, an adversarial perturbation is further performed to the clean video sample before applying the trigger pattern.

Preferably, a certain proportion of videos in the target class is randomly sampled and adversarially perturbed by Projected Gradient Descent (PGD).

Preferably, given a clean-trained model F and a target video x, the adversarial perturbation η is constructed by maximizing the loss L as, $$\max_{\|\eta\|_\infty < \epsilon} L(x+\eta), \quad (2)$$

where, $\|\cdot\|_\infty$ is the $l_\infty$-norm, and ε is the maximum perturbation.

Preferably, the type of perturbation includes uniform adversarial perturbation and targeted adversarial perturbation.

Preferably, the uniform adversarial perturbation perturbs the output probability to a uniform distribution so as to weaken the learning of the original features towards any classes.

Preferably, as to the uniform adversarial perturbation, the loss function L is $$L = \frac{1}{l} \sum_{j=1}^{l} \hat{y}_j \log(h_j), \quad (3)$$

where $h=F(\hat{x})$ is the softmax output, $\hat{x}=x+\eta$ is the perturbed sample, $$\hat{y} = \left[\frac{1}{l}, \ldots, \frac{1}{l}\right]\$,$$

and l is the number of classes.

Preferably, the targeted adversarial perturbation is used for targeted adversarial attacks.

Preferably, as to the targeted adversarial perturbation, given an input video x from the target class y, the loss function L is defined as $$L = -\frac{1}{l} \sum_{j=1}^{l} y_j \log(h_j), \quad (4)$$

where $h=F(\hat{x})$ is the softmax output, $\hat{x}=x+\eta$ is the perturbed sample and l is the number of classes.

In another aspect of this invention, it is provided a method for video backdoor attack, including a trigger generation step for generating a universal adversarial trigger pattern specific to a task, an adversarial perturbation step for producing videos with manipulated features; and an poisoning and inference step for injecting the generated trigger into perturbed videos as poisoned samples for training.

In yet another aspect of this invention, it is provided a system for video backdoor attack, including a trigger generation module for generating a universal adversarial trigger pattern specific to a task, an adversarial perturbation module for producing videos with manipulated features; and an poisoning and inference module for injecting the generated trigger into perturbed videos as poisoned samples for training;

wherein the trigger pattern is patched and optimized on videos from all non-target classes but relabeled to a target class, and the trigger pattern is a universal adversarial trigger pattern generated by minimizing the cross-entropy loss.

In a further aspect of this invention, it is provided a method for video backdoor attack, including a trigger generation step for generating a universal adversarial trigger pattern specific to a task, an adversarial perturbation step for producing videos with manipulated features; and an poisoning and inference step for injecting the generated trigger into perturbed videos as poisoned samples for training;

wherein the trigger pattern is patched and optimized on videos from all non-target classes but relabeled to a target class, and the trigger pattern is a universal adversarial trigger pattern generated by minimizing the cross-entropy loss.

BRIEF DESCRIPTION OF DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

Wherein.

EMBODIMENTS

Figure 1:
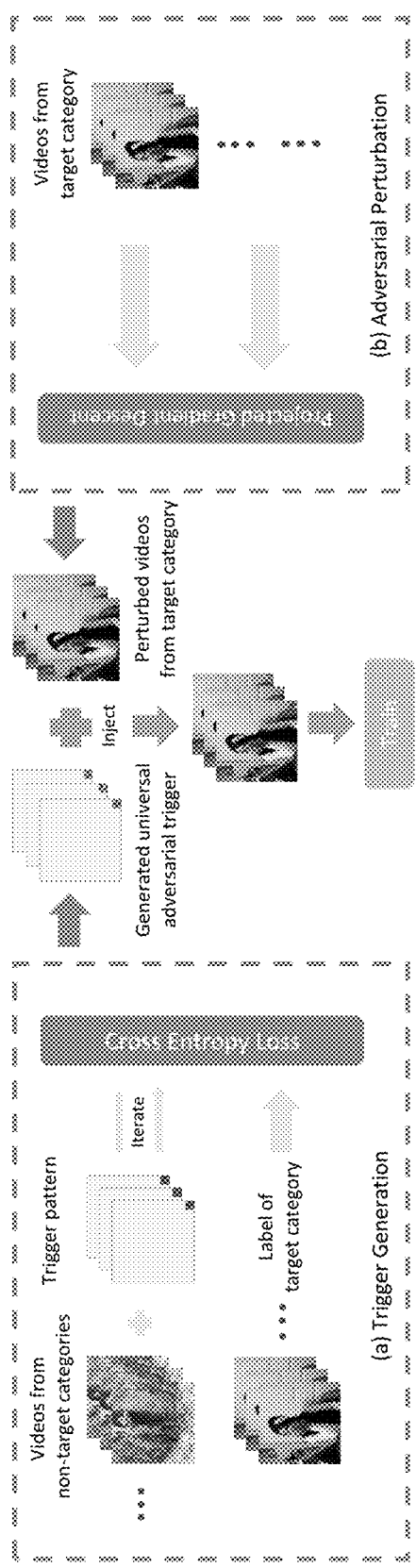
FIG. 1 illustratively shows the structure of the system for video backdoor attack according to one embodiment.

Before explaining at least one embodiment of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Embodiments of the subject matter and the functional operations described in this specification optionally can be implemented in digital electronic circuitry, or in computer software, firmware, or hardware, including the structures disclosed in this specification and their structural equivalents, or in combinations of one or more of them. Embodiments of the subject matter described in this specification can, for example, be implemented as one or more computer program products, e.g., one or more modules of computer program instructions encoded on a computer readable medium for execution by, or to control the operation of, data processing apparatus.

The computer readable medium can be a machine readable tangible storage device, a machine readable tangible storage substrate, a tangible memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

State-of-the-art video recognition models include the Inflated 3D ConvNet (I3D) and the CNN+LSTM. The I3D model is based on 2D ConvNet inflation and pooling kernels of traditional 2D CNNs and is able to learn hierarchical spatial-temporal information directly from videos. The CNN+LSTM model (Jiang et al., "Exploiting Feature and Class Relationships in Video Categorization with Regularized Deep Neural Networks", arXiv e-prints, page arXiv: 1502.07209, February 2015; Ng et al., "Beyond Short Snippets: Deep Networks for Video Classification", arXiv e-prints, page arXiv:1503.08909, March 2015) combines the advantages of both CNNs and LSTMs, that is, it utilizes CNN to extract spatial representations and LSTM to exploit the temporal information contained in successive frames. In addition, optical flow information is widely used in two-stream video recognition networks to improve the models' performance (Feichtenhofer et al., "Convolutional two-stream network fusion for video action recognition", *CVPR*, 2016).

In this application, we will apply our attack to invade I3D and CNN+LSTM models while discussing the effect of optical flow information in backdoor attacks.

In this part it is to introduce the proposed backdoor attack according to this application on video recognition models. The first to be described is the threat model, then the attack pipeline, and then the outline how to generate and apply the proposed universal adversarial trigger for the attack.

The threat model according to this invention is so built that the adversary is allowed to inject a small number of perturbed samples into the training set. The goal of the attack is to induce the network trained by end users to consistently predict a target class when the backdoor trigger is presented, but behave normally on clean data. Specifically, the adversary is assumed to know the architecture of the network that the end user uses and have access to training data, but has no permission to know any other configuration of the user's training procedure. For stealthiness, the attack is implemented under the clean-label setting.

The structure of the system for video backdoor attack is illustrated in FIG. 1. It consists of three modules:

(a) Trigger generation Module for generating a universal adversarial trigger pattern specific to a task. Given a clean training set and a clean-trained model on the data, it will generate a universal adversarial trigger using gradient information through iterative optimization;

(b) Adversarial perturbation Module for producing videos with manipulated features. Here we minimize an adversarial loss using Projected Gradient Descent (Madry et al., "Towards deep learning models resistant to adversarial attacks", arXiv preprint arXiv: 1706.06083, 2017) (PGD) to produce videos with adversarial perturbations towards the target class; and (c) Poisoning and Inference Module for injecting the generated trigger (by module (a)) into perturbed videos (by module (b)) as poisoned samples for training. At the inference part, it is to trick the target model trained on the poisoned data to predict the target class by attaching our universal adversarial trigger to a test video.

Given a clean-trained model on the clean training data, it is optimized to find a trigger pattern that minimizes the cross entropy loss towards the target class. The trigger pattern is patched and optimized on videos from all non-target classes but relabeled to the target class. This forces the network to predict the target class when the trigger pattern presents.

Specifically, given a trigger mask m, a trigger pattern t, videos in non-target categories x, one-hot vector of target label y with dimension 1, we generate a universal adversarial trigger pattern by minimizing the cross-entropy loss as following, $$\min_t \sum_{i=1}^{M} -\frac{1}{l} \sum_{j=1}^{l} y_j \log(h_j(\tilde{x}_i)), \tag{1}$$

where M is the total number of training samples from non-target classes, $h=F(\tilde{x})$ is the softmax output of the clean-trained model, $\tilde{x}=(1-m)*x+m*t$ is the poisoned samples.

By minimizing the above loss, we can find the universal (the same trigger pattern t for all non-target videos) adversarial trigger for a certain training dataset targeted to a target class.

The trigger pattern t is generated as follows. Firstly, it is to take a small region at the bottom right corner of the input video as the trigger area, and randomly initialize the area while mask off the other areas. During training, the trigger area is iteratively perturbed on different videos from all non-target classes (which are re-labeled to the target class). In other words, the perturbed trigger area on one video is kept and passed along to other videos for further perturbation.

The complete generation algorithm is described in Algorithm 1 as follows.

---

Algorithm 1 Universal Adversarial Trigger Generation

---

Require:
    Model F, Trigger Mask m, Learning Rate α, Non Target Videos Set $S = \{(x^{(j)}, y^{(j)})\}_{j-1}^{M}$, Target Label y, Total Steps N, Trigger Size w, Batch Size B
Ensure: Universal Trigger t
1:    t = InitializeTrigger(w)
2:    for i in range(N) do
3:        $S_i = \{(x^{(j)}, y^{(j)})\}_{j-1}^{B}$ = RandomlyPick(S, B)
4:        $\tilde{x}^{(j)} = (1 - m) * x^{(j)} + m * t, (x^{(j)}, y^{(j)}) \in S_i$
5:        $h = F(\tilde{x}^{(j)})$ 6:
$$L = \sum_{j=1}^{B} -\frac{1}{l} \sum_{k=1}^{l} [y_k^{(j)} \log(h_k)]$$

$$\delta = \frac{\partial L}{\partial t}$$

7:
8:        t = t − α * sign(δ)
9:    end for
10:   return t

---

In order to enhance the backdoor trigger and make the features of the original videos less salient, adversarial perturbation (a kind of unnoticeable and structured noise) is further performed, to the clean video sample before applying the backdoor trigger of this invention. This reduces the interference of the original content and encourage the network to pay more attention to the trigger.

Specifically, it is to randomly sample a certain proportion of videos in the target class and adversarially perturb them by PGD. These perturbed videos are then patched by our universal adversarial backdoor trigger (generated previously) as poisoned samples. Formally, given a clean-trained model F and a target video x, we construct the adversarial perturbation η by maximizing the loss L as, $$\max_{\|\eta\|_\infty < \epsilon} L(x + \eta), \tag{2}$$

where, $\|\cdot\|_\infty$ is the $l_\infty$-norm, and ε is the maximum perturbation.

Two types of perturbations are introduced, which correspond to two different loss functions. They are both intuitively useful for effective backdoor attacks and are empirically evaluated (see below)

One type is uniform adversarial perturbation. It perturbs the output probability to a uniform distribution so as to weaken the learning of the original features towards any classes. Accordingly, the loss function L is, $$L = \frac{1}{l} \sum_{j=1}^{l} \hat{y}_j \log(h_j), \tag{3}$$

where $h=F(\hat{x})$ is the softmax output, $\hat{x}=x+\eta$ is the perturbed sample, $$\hat{y} = \left[\frac{1}{l}, \ldots, \frac{1}{l}\right]\$,$$

and l is the number of classes. Note that maximizing this loss function is equivalent to minimizing the cross entropy loss with respect to ŷ. Videos with this uniform adversarial perturbation tend to lose any strong natural features. Thus, the model will more responsive to salient characteristics such as the backdoor trigger pattern.

The other type is targeted adversarial perturbation. This perturbation has been proposed in the field of adversarial research for targeted adversarial attacks. Given an input video x from the target class y, the loss function L is defined as, $$L = -\frac{1}{l} \sum_{j=1}^{l} y_j \log(h_j), \tag{4}$$

where $h=F(\hat{x})$ is the softmax output, $\hat{x}=x+\eta$ is the perturbed sample and l is the number of classes. Empirically, we find that targeted perturbations may switch the network's output from one class to another with overconfident prediction. Thus, when applied with these perturbations, the perturbed video tends to have a strong pattern towards another class in deep feature space. This also forces the target model to capture the trigger pattern during training.

To complete the attack according to this invention, it is to inject the generated universal adversarial trigger into the obtained perturbed videos (vide supra). The poisoned videos are provided to users along with the rest of clean videos for training. At the inference stage, we patch the same trigger to test videos and the infected model will be manipulated to output the target class. At this point, we have implemented a complete backdoor attack.

Here clean-label backdoor attacks in video is studied from two complementary aspects. The universal adversarial trigger is the foundation of the method of this invention. It contains abundant inherent information which caters to the prior distribution of the target class, which makes video attacks possible and practical. Two different adversarial perturbations significantly interfere with the original features of videos in the target class to induce the model to learn more about the trigger pattern.

Experiments

Here it is to evaluate the effectiveness of our proposed backdoor attack on video recognition models, and resistance to state-of-the-art backdoor detection methods. It is also conducted a comprehensive ablation study on various aspects of our attack.

Here two benchmark datasets for video recognition are used: UCF-101 and HMDB-51 (Kuehne et al., "Hmdb51: A large video database for human motion recognition", ICCV, 2011), and two state-of-the-art video recognition models: I3D and CNN+LSTM.

For I3D, we use a kinetics-400 pretrained model to initialize and sample 64 frames per video for fine-tuning on UCF-101 and HMDB-51. For CNN+LSTM, we use a fixed ImageNet pretrained ResNet50 as the CNN feature extractor and train LSTM on top of it. Input video frames are subsampled by keeping one out of every 5 for CNN+LSTM model. The test accuracy of these models can be found in Table 2 (vide infra).

TABLE 2

| Model | UCF-101 | HMDB-51 |
|---|---|---|
| I3D | 91.5 | 63.4 |
| CNN + LSTM | 76.6 | 45.3 |

We use these clean-trained models to generate the universal adversarial triggers and adversarial perturbations. The size of input frame in both two models is set to 224×224. Here, we only consider RGB models, and later we will analyze our attacks on two-stream networks that consist of RGB and optical flow information (vide infra).

We transfer the image-based clean-label backdoor attack in Turner et al. (vide supra) directly to video frames as our baseline. For the baseline attack, we choose the PGD method bounded in $l_\infty$-norm to apply adversarial perturbations (also for our targeted adversarial perturbations). Then, we install a fixed static trigger into frames of poisoned videos.

Figure 2:
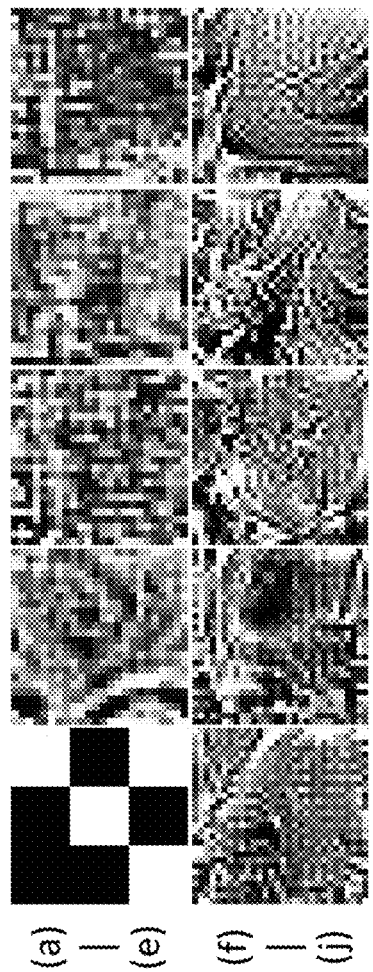
FIG. 2 illustratively shows the examples of different triggers used in the experiments.

FIG. 2 illustratively shows the examples of different triggers:

(a) a fixed static trigger we use in both video and image tasks as our baseline;

(b)-(e) our universal adversarial trigger on 4 different frames in a video for target class "ApplyEyeMakeup" in UCF-101 against I3D model; and (f)-(g): universal adversarial triggers for 5 categories (eg. "aeroplane", "bus", "diningtable", "pottedplant" and "tvmonitor") from VOC2012 image classification We implement our attack following the above pipeline and utilize the targeted adversarial perturbations here for fair comparison. It is worth mentioning that the accuracy of the infected models on clean test set has no obvious decline compared with clean trained models (in some cases, the test accuracy are even higher).

All our attacks are applied under the clean-label setting. We generate our universal adversarial triggers using Algorithm 1, with learning rate $\alpha=1$ for 2000 steps. In each step, we randomly sample 10 videos to calculate the average gradient. For adversarial perturbation, we optimize Eqn. 2 using PGD with $\varepsilon=16$.

The attack success rate (ASR) is selected as the evaluation metric, which is the fraction of inputs not labeled as the target class but misclassified to the target class after the backdoor trigger is applied. All experiments are run on a GeForce GTX 1080Ti GPU.

Figure 3:
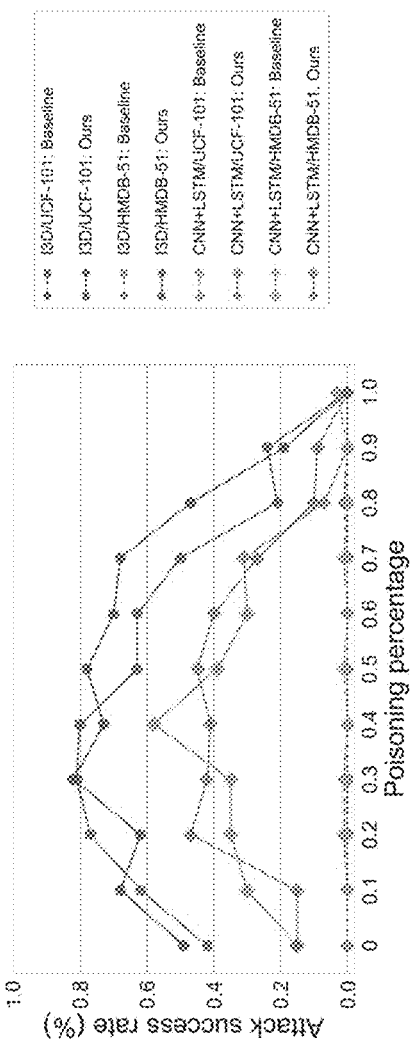
FIG. 3 illustratively shows the attack performance under different trigger sizes used in the experiments.
Figure 3:
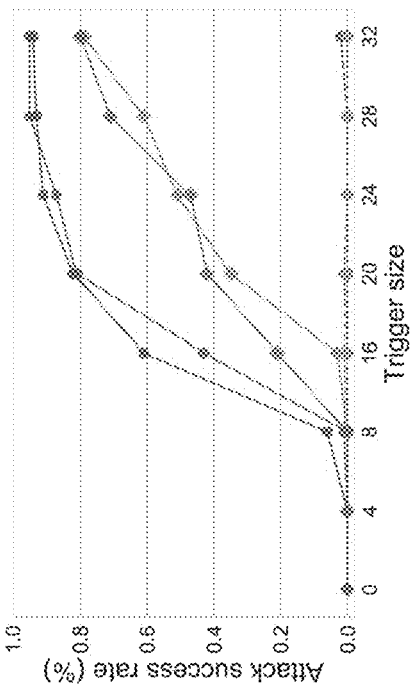

We first evaluate the attack performance under different trigger sizes. The results are shown in the left subfigure of FIG. 3.

As can be observed, the baseline attack has an extremely low level of attack success rate even when the trigger size is as large as 32, while the attack success rate of our attack rises rapidly with the increase of the trigger size and reach a plateau eventually. Against I3D model on UCF-101, our proposed attack achieves 61.2\% even at a small trigger size of 16 (which only accounts for 0.005\% of the total image area). When the trigger size increases to 28, our attack can successfully attack the target model 93.7\% of the time. In general, larger trigger size leads to stronger attack.

However, this will inevitably make the trigger more conspicuous. A trade-off should be made between attack success rate and stealthiness in real-world application.

We then demonstrate the impact of poisoning percentage (eg. the proportion of poisoned videos in the target class) on the attack performance. We choose the same class used above as the target class and fix trigger size to 20×20. The attack success rate with respect to different poisoning percentages is shown in the right subfigure of FIG. 3.

Besides the poor performance of the baseline attack, we find that attack success rate does not increase monotonically with the poisoning percentage, instead, it first rises then drops. The attack success rate is over 60% when poisoning percentage varies from 20% to 70%, but decreases dramatically once out of this range (even reduces to nearly 0% at poisoning percentage of 100%). We suspect this surprising phenomenon is caused by the following reason. The universal adversarial trigger is designed to reflect the inherent pattern of the target class. If the poisoning percentage is excessively high that there are few clean videos are left in the target class, the model will learn almost nothing about the original features of the target class and turn to new features that are more salient than the trigger generated by the clean-trained model, resulting in a rapid decline in performance.

We further choose 10 categories in UCF-101 as the target class respectively against the I3D model under the best poisoning percentage of 30% (trigger size is set to 20×20). The results are shown in Table 3. Our attack performs well and is significantly better than the baseline attack across all the 10 target categories.

TABLE 3

| Method | Apply EyeMakeup | Biking | Clean& Jerk | Frisbee Catch | Horse Race | Long Jump | Playing Dhol | Punch | Skiing | Taichi |
| --- | --- | --- | --- | --- | --- | --- | --- | --- | --- | --- |
| | | | | class | | | | | | |
| Baseline | 1.1 | 0.5 | 0.0 | 3.8 | 0.1 | 0.0 | 2.9 | 0.6 | 0.0 | 2.6 |
| Ours | 82.2 | 76.2 | 87.5 | 88.0 | 70.2 | 74.9 | 91.3 | 82.5 | 81.7 | 86.0 |

To better understand our attack, we perform extensive ablation studies with 3 different types of triggers enhanced by two different adversarial perturbations (eg. uniform versus targeted). We train I3D models on UCF-101/HMDB-51 and choose "ApplyEyeMakeup" as the target category. We set trigger size to be 20 $\times$20 and poisoning percentage to be 30\%. The results are shown in Table 4.

TABLE 4

| | Fixed static trigger | | | Randomly sampled trigger | | | Universal adversarial trigger | | |
| --- | --- | --- | --- | --- | --- | --- | --- | --- | --- |
| | None | targeted | uniform | None | targeted | uniform | None | targeted | uniform |
| UCF-101 | 0.0 | 0.0 | 0.0 | 2.2 | 0.0 | 1.7 | 61.1 | 82.2 | 76.9 |
| HMDB-51 | 0.0 | 1.4 | 0.0 | 0.0 | 4.1 | 0.0 | 69.2 | 81.0 | 81.7 |

We first explore three different types of triggers:
1) fixed static trigger,
2) randomly sampled trigger, and
3) universal adversarial trigger.

As can be seen from Table 4, neither the fixed static trigger nor the randomly sampled trigger are effective. The usage of universal adversarial trigger drastically increases the attack success rate. Both of the two different adversarial enhancements (eg. targeted versus uniform) can improve success rate by around 10%-20%, with targeted adversarial perturbation more effective on UCF-101 dataset while uniform adversarial perturbation more effective on HMDB-51 dataset.

Optical flow information is often exploited to improve the performance of video recognition models. Here, we test this factor in our attack. We utilize both RGB and optical flow as inputs to construct a two-stream network. For our attack, we first inject the RGB trigger to videos, then generate optical flow of these poisoned videos using TV-L1 algorithm 1. We choose the average function to fuse the two streams and test on UCF-101 with I3D model. We visualize an example of poisoned RGB inputs and its corresponding optical flow input in FIG. 4.

Figure 4:
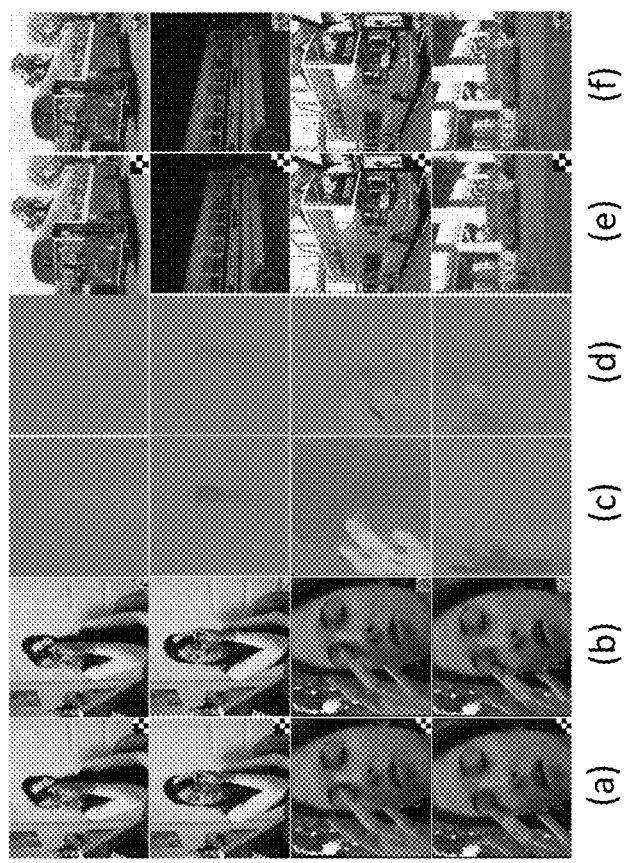
FIG. 4 illustratively shows the examples of different poisoned data used in the experiments.

FIG. 4 illustratively shows the examples of different poisoned data, wherein
columns (a)/(b) show videos poisoned by fixed static trigger/universal adversarial trigger;
columns (c)/(d) show optical flow information of corresponding videos in (b) in x/y directions, while
columns (e)/(f) show images poisoned by fixed static trigger/universal adversarial trigger (respectively for 4 target categories in 4 different experiments).

We find that the optical flow inhibits backdoor attack to some extent. When trigger size is set to 20×20 and poisoning percentage 0.7, the attack success rate is 15.2% on optical flow network, 68.5% on RGB network and 54.7% on fused two-stream network. This degradation of performance is mainly attributed to the independence of the RGB space to the optical flow space, which makes transfer of the universal adversarial trigger generated in the RGB space less effective in the optical flow space.

Here, we explore the generalization capability of our attack on images against image classification models. The experiments are conducted on VOC2012 which is a "sparse dataset" (20 classes, around 400 images per class) and high resolution (224×224). We randomly choose 5 target categories and test the attack success rates under different poisoning percentages.

Figure 5:
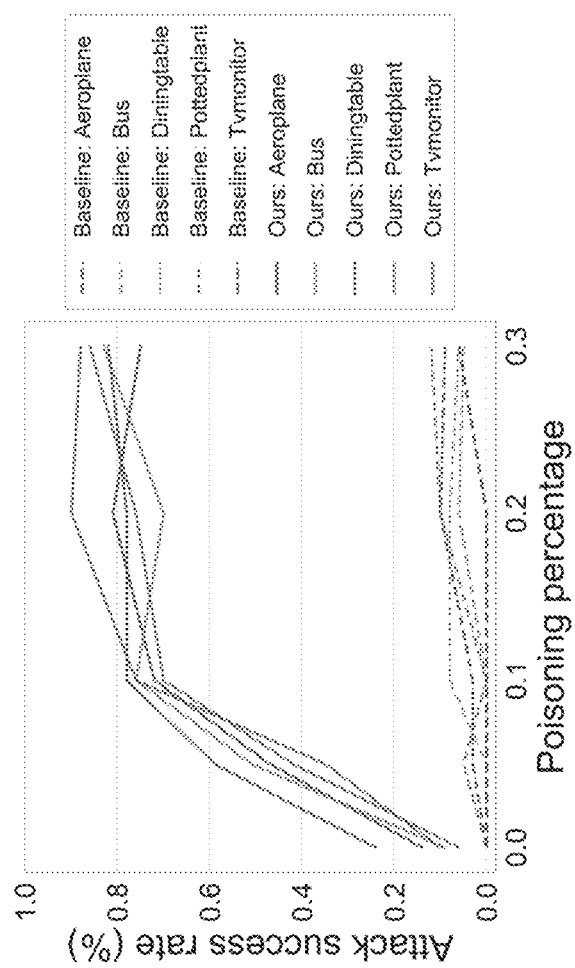
FIG. 5 illustratively shows the comparative results on the image task in the experiments.

FIG. 5 illustratively shows the comparative results on the image task. The target model is a ResNet50 with input size 224×224. We follow the same pipeline in Turner et al. as our baseline and apply the same targeted adversarial perturbation (for enhancement) for both attacks. The trigger size is 30×30 and c in Eqn. (2) is 8. (All triggers are illustrated in FIG. 2.)

Again, our method can effectively improve the attack performance under these strict conditions (eg. sparse dataset and high resolution) with images. The results confirm the effectiveness and generalization of our proposed attack on images, especially under strict conditions.

The next is to test the resistance of our attack approach to the backdoor defense methods. Several detection methods have been proposed to defend against backdoor attacks.

The simplest and most natural way is to perform data augmentation by introducing flips and crops to eliminate the trigger pattern. Other detection methods exploit feature characteristics of backdoor images to train effective detection classifiers.

Tran et al. ("Spectral signatures in backdoor attacks", NIPS, 2018) propose a method to avoid backdoor attacks by detecting the presence of poisoned examples in the training set, based on Spectral Signatures. The intuition is that poisoned data may appear abnormal in the latent DNN space compared with clean data in the same class. The user can remove the backdoor outliers from the training set via singular value decomposition (SVD), then retrain the model on the purified data.

Wang et al. ("Neural cleanse: Identifying and mitigating backdoor attacks in neural networks", SP, 2019) propose Neural Cleanse to avoid backdoor attacks by examining whether or not a trained model is infected. Neural Cleanse exploits gradient information to reverse engineer possible triggers, then detect outliers (eg. triggers) using a robust statistics measure called median absolute deviation (MAD). Neural Cleanse is based on the assumption that smaller modifications are required to cause misclassification in an infected model compared with a clean model.

Data augmentation is a common technique to diversify datasets, which includes randomly sampling, cropping, or rotating some frames in video recognition tasks. This process might reduce the performance of backdoor attacks by randomly removing or destroying the trigger patched to the poisoned videos.

To test whether it is an effective way to avoid our attacks, we do experiments using I3D trained on UCF-101. We set trigger size to 20×20, and poisoning percentage to 30%. With data augmentation, the attack success rate can still reach 56.3%. This is because our universal adversarial trigger is powerful enough that it achieves great attack results even with an extremely low poisoning percentage (68.1% at poisoning percentage of 0.001% with respect to the entire dataset). In practice, data augmentation can be effectively evaded by simply increasing the poisoning percentage.

As mentioned in above, Tran et al. proposes Spectral Signatures to detect backdoor attacks by filtering suspected samples in training set. We conduct experiments to test whether or not this defense method can detect our attack. The results are shown in Table 5.

TABLE 5

| Conditions | #Clean | #Poisoned | #Clean removed | #Poisoned removed |
| --- | --- | --- | --- | --- |
| Trigger Perturbation | 71 | 30 | 2 | 28 |
| Trigger | 71 | 30 | 1 | 29 |
| Perturbation | 71 | 30 | 18 | 12 |

As shown in Table 5, it is to test the detection performance of spectral signatures (Tran et al.) against our attack on I3D model and UCF-101 dataset. We use set ε to 1.5, trigger size to 20×20, poisoning percentage to 30% and select target class "ApplyEyeMakeup".

We find that most of the poisoned videos are removed by this method (28/30 for "Trigger and Perturbation" and 29/30 for "Trigger") once the universal adversarial trigger presents. Their success may be caused by huge separation of distributions between poisoned and clean videos in latent space by our attack. However, as we have empirically shown in the right subfigure of FIG. 3 that our attack can still achieve high success rate >40% even when only <1% of data is poisoned.

As also discussed above, Neural Cleans detects whether a trained model has been infected by backdoor attacks, for which it assumes that samples generally require smaller modifications to be misclassified into the target class. Here, we test the resistance of our proposed attack to Neural Cleans with I3D model on UCF-101 dataset, trigger size 20×20 and poisoning percentage 30%.

Figure 6:
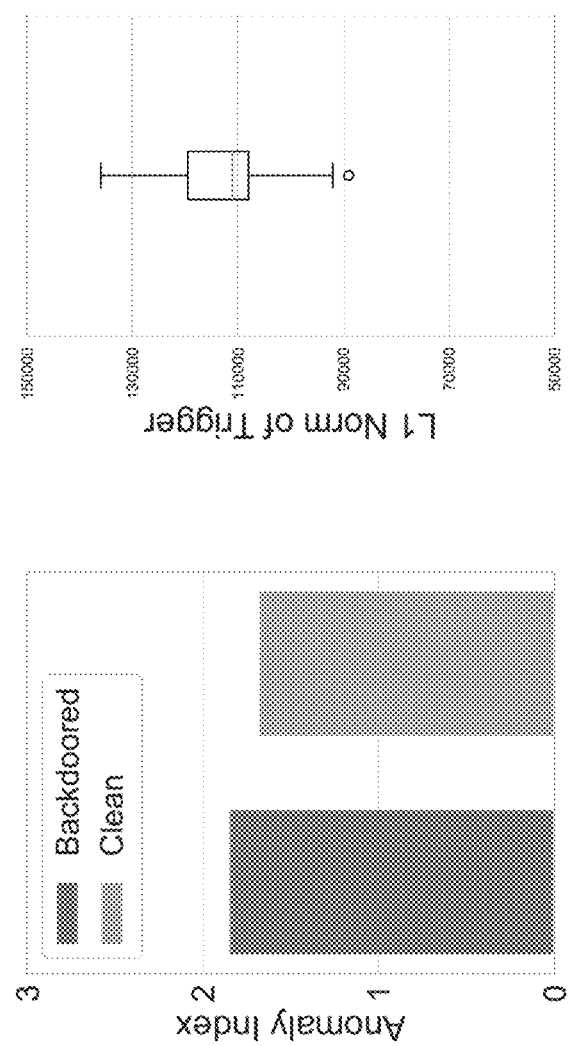
FIG. 6 illustratively shows the test result of the resistance of the proposed attack.

FIG. 6 illustratively shows the test result. The left subfigure of FIG. 6 shows anomaly measurement of backdoored vs clean model by how much the class with the smallest trigger deviates from the remaining classes. An anomaly index>2 indicates a detected backdoored model. The right subfigure of FIG. 6 shows $l_1$-norm of triggers for infected vs uninfected classes in backdoored I3D model by our attack. Box plot shows min/max and quarterlies, and the dot represents the target class. Detailed interpretation of the two plots can be find in Wang et al.

As shown in FIG. 6, Neural Cleans fails to detect the backdoored I3D model by our attack, i.e., anomaly index <2 for the backdoored model. This is because the modifications made by their reversed triggers has similar effect in the deep feature space as our universal adversarial trigger, thus no difference (or outlier) can be detected. Thereby, our proposed attack is resistant to Neural Cleanse.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The invention claimed is:

1. A system for video backdoor attack, comprising:
   a trigger generation module for generating a universal adversarial trigger pattern specific to a task;
   an adversarial perturbation module for producing videos with manipulated features; and
   a poisoning and inference module for injecting the generated trigger into perturbed videos as poisoned samples for training;
   wherein the trigger pattern is patched and optimized on videos from all non-target classes but relabeled to a target class, and
   the trigger pattern is a universal adversarial trigger pattern generated by minimizing the cross-entropy loss.

2. The system of claim 1, wherein the universal adversarial trigger pattern is generated by minimizing the cross-entropy loss as follows:

$$\min_t \sum_{i=1}^{M} -\frac{1}{l}\sum_{j=1}^{l} y_j \log(h_j(\tilde{x}_i)), \quad (1)$$

wherein t represents the trigger pattern, x represents the videos in non-target categories, y represents the target label, l represents dimension of the one-hot vector of target label y, M is the total number of training samples from non-target classes, h=F(x̃) is the softmax output of the clean-trained model, x̃=(1−m)*x+m*t is the poisoned samples.

3. The system of claim 1, wherein a small region at the bottom right corner of the input video is taken as a trigger area, and the trigger area is randomly initialized while the other areas are masked off.

4. The system of claim 3, wherein during training, the trigger area is iteratively perturbed on different videos from all non-target classes, which are re-labeled to the target class.

5. The system of claim 1, wherein the adversarial perturbation is further performed to the clean video sample before applying the trigger pattern.

6. The system of claim 1, wherein a certain proportion of videos in the target class is randomly sampled and adversarially perturbed by Projected Gradient Descent (PGD).

7. The system of claim 1, wherein given a clean-trained model F and a target video x, the adversarial perturbation η is constructed by maximizing the loss L as, $$\max_{\|\eta\|_\infty < \epsilon} L(x+\eta), \quad (2)$$

where, $\|\cdot\|_\infty$ is the $l_\infty$-norm, and ε is the maximum perturbation.

8. The system of claim 1, wherein the type of perturbation includes uniform adversarial perturbation and targeted adversarial perturbation.

9. The system of claim 8, wherein the uniform adversarial perturbation perturbs the output probability to a uniform distribution so as to weaken the learning of the original features towards any classes.

10. The system of claim 9, wherein as to the uniform adversarial perturbation, the loss function L is $$L = \frac{1}{l}\sum_{j=1}^{l} \hat{y}_j \log(h_j), \quad (3)$$

where $h=F(\hat{x})$ is the softmax output, $\hat{x}=x+\eta$ is the perturbed sample, $$\hat{y} = \left[\frac{1}{l}, \ldots, \frac{1}{l}\right]\$,$$

and l is the number of classes.

11. The system of claim 8, wherein, the targeted adversarial perturbation is used for targeted adversarial attacks.

12. The system of claim 11, wherein, as to the targeted adversarial perturbation, given an input video x from the target class y, the loss function L is defined as $$L = -\frac{1}{l}\sum_{j=1}^{l} y_j \log(h_j), \quad (4)$$

where $h=F(\hat{x})$ is the softmax output, $\hat{x}=x+\eta$ is the perturbed sample and l is the number of classes.

13. A method for video backdoor attack, including
a trigger generation step for generating a universal adversarial trigger pattern specific to a task,
an adversarial perturbation step for producing videos with manipulated features; and
an poisoning and inference step for injecting the generated trigger into perturbed videos as poisoned samples for training;
wherein the trigger pattern is patched and optimized on videos from all non-target classes but relabeled to a target class, and
the trigger pattern is a universal adversarial trigger pattern generated by minimizing the cross-entropy loss.

14. The method of claim 13, wherein the universal adversarial trigger pattern is generated by minimizing the cross-entropy loss as follows:

$$\min_{t} \sum_{i=1}^{M} -\frac{1}{l}\sum_{j=1}^{l} y_j \log(h_j(\tilde{x}_i)), \quad (1)$$

wherein t represents the trigger pattern, x represents the videos in non-target categories, y represents the target label, l represents dimension of the one-hot vector of target label y, M is the total number of training samples from non-target classes, $h=F(\tilde{x})$ is the softmax output of the clean-trained model, $\tilde{x}=(1-m)*x+m*t$ is the poisoned samples.

15. The method of claim 13, wherein a small region at the bottom right corner of the input video is taken as a trigger area, and the trigger area is randomly initialized while the other areas are masked off.

16. The method of claim 13, wherein during training, the trigger area is iteratively perturbed on different videos from all non-target classes, which are re-labeled to the target class.

17. The method of claim 13, wherein the adversarial perturbation is further performed to the clean video sample before applying the trigger pattern.

18. The method of claim 13, wherein a certain proportion of videos in the target class is randomly sampled and adversarially perturbed by Projected Gradient Descent (PGD).

* * * * *